US007757492B2

(12) United States Patent
Intile et al.

(10) Patent No.: US 7,757,492 B2
(45) Date of Patent: Jul. 20, 2010

(54) METHOD AND APPARATUS TO FACILITATE COOLING TURBINE ENGINES

(75) Inventors: John Charles Intile, Simpsonville, SC (US); Madhavan Poyyapakkam, Karnataka (IN); Ganesh Pejawar Rao, Karnataka (IN); Karthick Kaleeswaran, Karnataka (IN)

(73) Assignee: General Electric Company, Schenectady, NY (US)

( * ) Notice: Subject to any disclaimer, the term of this patent is extended or adjusted under 35 U.S.C. 154(b) by 509 days.

(21) Appl. No.: 11/750,500

(22) Filed: May 18, 2007

(65) Prior Publication Data

US 2008/0282667 A1 Nov. 20, 2008

(51) Int. Cl.
*F02C 1/00* (2006.01)
*F02G 3/00* (2006.01)

(52) U.S. Cl. ............................ 60/752; 60/772; 60/753; 60/754; 60/755; 60/757; 60/758; 60/759; 60/760; 60/796; 60/800

(58) Field of Classification Search .................. 60/772, 60/752–760, 722, 796, 800
See application file for complete search history.

(56) References Cited

U.S. PATENT DOCUMENTS

| | | | |
|---|---|---|---|
| 4,195,474 A | 4/1980 | Bintz et al. | |
| 4,211,069 A | 7/1980 | Kalbfuss | |
| 4,297,843 A | 11/1981 | Sato et al. | |
| 4,719,748 A | 1/1988 | Davis, Jr. et al. | |
| 4,903,477 A | 2/1990 | Butt | |
| 5,761,898 A | 6/1998 | Barnes et al. | |
| 6,546,730 B2 * | 4/2003 | Johnson et al. | 60/752 |
| 6,619,915 B1 * | 9/2003 | Jorgensen | 415/138 |
| 6,772,595 B2 * | 8/2004 | Martling et al. | 60/737 |
| 7,137,241 B2 | 11/2006 | Martling et al. | |

FOREIGN PATENT DOCUMENTS

JP 09196377 A * 7/1997

* cited by examiner

*Primary Examiner*—Michael Cuff
*Assistant Examiner*—Craig Kim
(74) *Attorney, Agent, or Firm*—Armstrong Teasdale LLP

(57) ABSTRACT

A method facilitates assembling a gas turbine engine including a combustor assembly and a nozzle assembly. The method comprises providing a transition piece including a first end, a second end, and a body extending therebetween, where the body includes an inner surface, an opposite outer surface, coupling the first end of the transition piece to the combustor assembly, and coupling the second end of the transition piece to the nozzle assembly such that a turbulator extending helically over the outer surface of the transition piece extends from the transition piece first end to the transition piece second end to facilitate inducing turbulence to cooling air supplied to the combustor assembly.

18 Claims, 3 Drawing Sheets

METHOD AND APPARATUS TO FACILITATE COOLING TURBINE ENGINES

BACKGROUND OF THE INVENTION

This invention relates generally to gas turbine engines and more particularly, to transition pieces used with gas turbine engines.

At least some known gas turbine engines include a transition piece that is coupled between a combustor assembly and a turbine nozzle assembly. To facilitate controlling operating temperatures of the transition piece within known engines, cooling air is channeled from a compressor towards the transition piece. More specifically, in at least some known gas turbine engines, the cooling air is discharged from the compressor into a plenum that extends at least partially around the transition piece of the combustor assembly. A portion of the cooling air entering the plenum is supplied into a channel defined between an impingement sleeve extending around the transition piece and the transition piece. Cooling air entering the cooling channel is discharged towards a combustor.

To enhance the effectiveness of the cooling air in the channel, at least some known transition pieces include axially-spaced turbulence-promoting ribs or turbulators, that extend outward from an outer surface of the transition piece. Known transition piece turbulators are oriented substantially perpendicularly to the flow of the cooling air in the cooling channel. These known transition pieces create turbulence by attaching a plurality of turbulators on a surface over which the air travels which creates air turbulence. When air flow comes into contact with the axially adjacent circumferential turbulator rings, the air flow slows as the air is forced over the turbulators and the pressure drop across the transition piece increases. To facilitate reducing such pressure drops, at least some known transition pieces are fabricated with a limited number of turbulators. However, as the number of turbulators is decreased, the efficiency of cooling the transition piece may also be decreased.

BRIEF DESCRIPTION OF THE INVENTION

In one aspect, a method facilitates assembling a gas turbine engine including a combustor assembly and a nozzle assembly. The method comprises providing a transition piece including a first end, a second end, and a body extending therebetween, where the body includes an inner surface, an opposite outer surface, coupling the first end of the transition piece to the combustor assembly, and coupling the second end of the transition piece to the nozzle assembly such that a turbulator extending helically over the outer surface of the transition piece extends from the transition piece first end to the transition piece second end to facilitate inducing turbulence to cooling air supplied to the combustor assembly.

In another aspect, a transition piece for a gas turbine engine is provided. The transition piece includes a first end, a second end, and a body extending therebetween, the body comprises an inner surface, an opposite outer surface, and a turbulator extending helically over the outer surface, the turbulator configured to facilitate cooling the transition piece.

In a further aspect, a gas turbine engine is provided. The gas turbine engine system includes a combustion assembly and a transition piece coupled to the combustion assembly and extending downstream therefrom, the transition piece comprises a first end, a second end, and a body extending therefrom, the body comprises an inner surface, an outer surface, and a turbulator extending helically over the outer surface, from the first end to the second end.

DETAILED DESCRIPTION OF THE INVENTION

Figure 1:
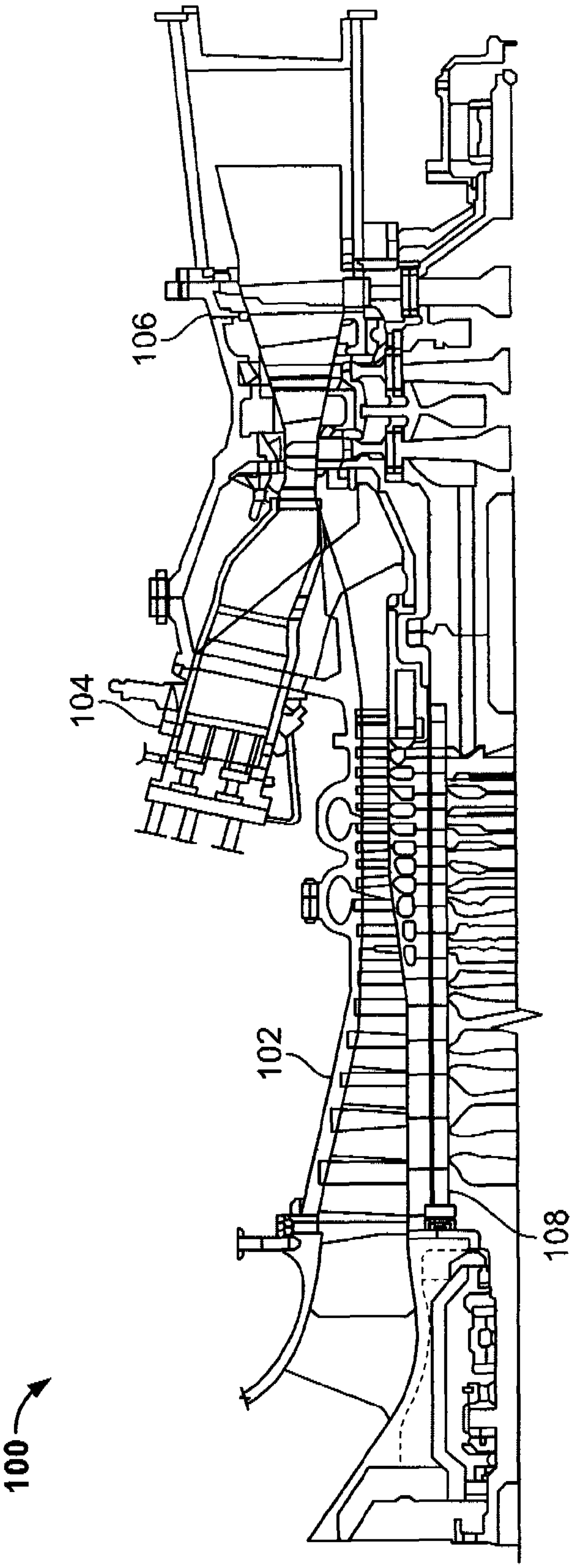
FIG. 1 is a schematic cross-sectional view of an exemplary gas turbine engine.

FIG. 1 is a schematic cross-sectional view of an exemplary gas turbine engine 100. Engine 100 includes a compressor assembly 102, a combustor assembly 104, a turbine assembly 106 and a common compressor/turbine rotor shaft 108. It should be noted that engine 100 is exemplary only, and that the present invention is not limited to engine 100 and may instead be implemented within any gas turbine engine that functions as described herein.

In operation, air flows through compressor assembly 102 and compressed air is discharged to combustor assembly 104. Combustor assembly 104 injects fuel, for example, natural gas and/or fuel oil, into the air flow, ignites the fuel-air mixture to expand the fuel-air mixture through combustion and generates a high temperature combustion gas stream (not shown). Combustor assembly 104 is in flow communication with turbine assembly 106, and discharges the high temperature expanded gas stream into turbine assembly 106. The high temperature expanded gas stream imparts rotational energy to turbine assembly 106 and because turbine assembly 106 is rotatably coupled to rotor 108, rotor 108 subsequently provides rotational power to compressor assembly 102.

Figure 2:
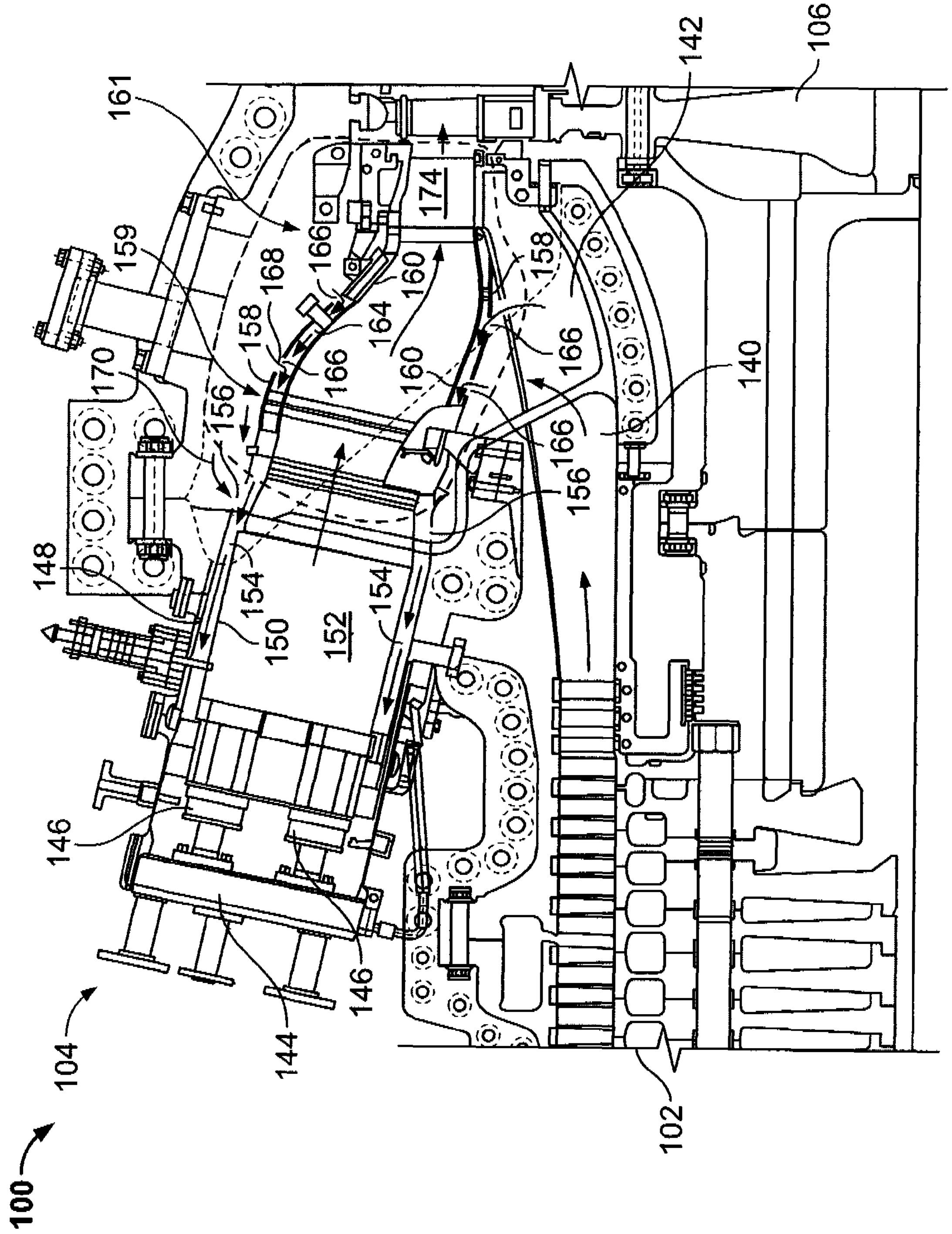
FIG. 2 is an enlarged cross-sectional view of a portion of an exemplary combustor assembly that may be used with the gas turbine engine shown in FIG. 1.

FIG. 2 is an enlarged cross-sectional view of a portion of combustor assembly 104. Combustor assembly 104 is coupled in flow communication with turbine assembly 106 and with compressor assembly 102. Compressor assembly 102 includes a diffuser 140 and a discharge plenum 142 that is coupled in flow communication to, and downstream from, plenum 142 to facilitate channeling air towards combustor assembly 104 as described in more detail below.

In the exemplary embodiment, combustor assembly 104 includes an annular dome plate 144 that at least partially supports a plurality of fuel nozzles 146 and that is coupled to a substantially cylindrical combustor flowsleeve 148 with retention hardware (not shown in FIG. 2). A substantially cylindrical combustor liner 150 is positioned within flowsleeve 148 and is supported via flowsleeve 148. A substantially cylindrical combustor chamber 152 is defined by liner 150. More specifically, liner 150 is spaced radially inward from flowsleeve 148 such that an annular combustion liner cooling passage 154 is defined between combustor flowsleeve 148 and combustor liner 150. Flowsleeve 148 includes a plurality of inlets 156 which provide a flow path into cooling passage 154.

An impingement sleeve 158 is coupled substantially concentrically to combustor flowsleeve 148 at an upstream end 159 of impingement sleeve 158, and a transition piece 160 is coupled to a downstream side 161 of impingement sleeve 158. Transition piece 160 facilitates channeling combustion gases generated in chamber 152 downstream towards a turbine nozzle 174. A cooling passage 164 is defined between impingement sleeve 158 and transition piece 160. A plurality of openings 166 defined within impingement sleeve 158 enable a portion of air flow discharged from compressor discharge plenum 142 is channeled into transition piece cooling passage 164.

During operation, compressor assembly 102 is driven by turbine assembly 106 via shaft 108 (shown in FIG. 1). As compressor assembly 102 rotates, compressed air is discharged into diffuser 140 as indicated in FIG. 2 with a plurality of arrows. In the exemplary embodiment, the majority of air discharged from compressor assembly 102 is channeled through compressor discharge plenum 142 towards combustor assembly 104, and a smaller portion of air discharged from compressor assembly 102 is channeled downstream for use in cooling engine 100 components. More specifically, a first flow leg 168 of compressed air within plenum 142 is channeled into transition piece cooling passage 164 via impingement sleeve openings 166. Air entering opening 166 is channeled upstream within transition piece cooling passage 164 and discharged into combustion liner cooling passage 154. A second flow leg 170 of compressed air within plenum 142 is channeled around impingement sleeve 158 and enters combustion liner cooling passage 154 via inlets 156. Air entering inlets 156 and air from transition piece cooling passage 164 is then mixed within passage 154 and is then discharged into fuel nozzles 146 wherein it is mixed with fuel and ignited within combustion chamber 152.

Flowsleeve 148 substantially isolates combustion chamber 152 and its associated combustion processes from the outside environment, for example, surrounding turbine components. The resultant combustion gases are channeled from chamber 152 through transition piece 160 towards turbine nozzle 174.

Figure 3:
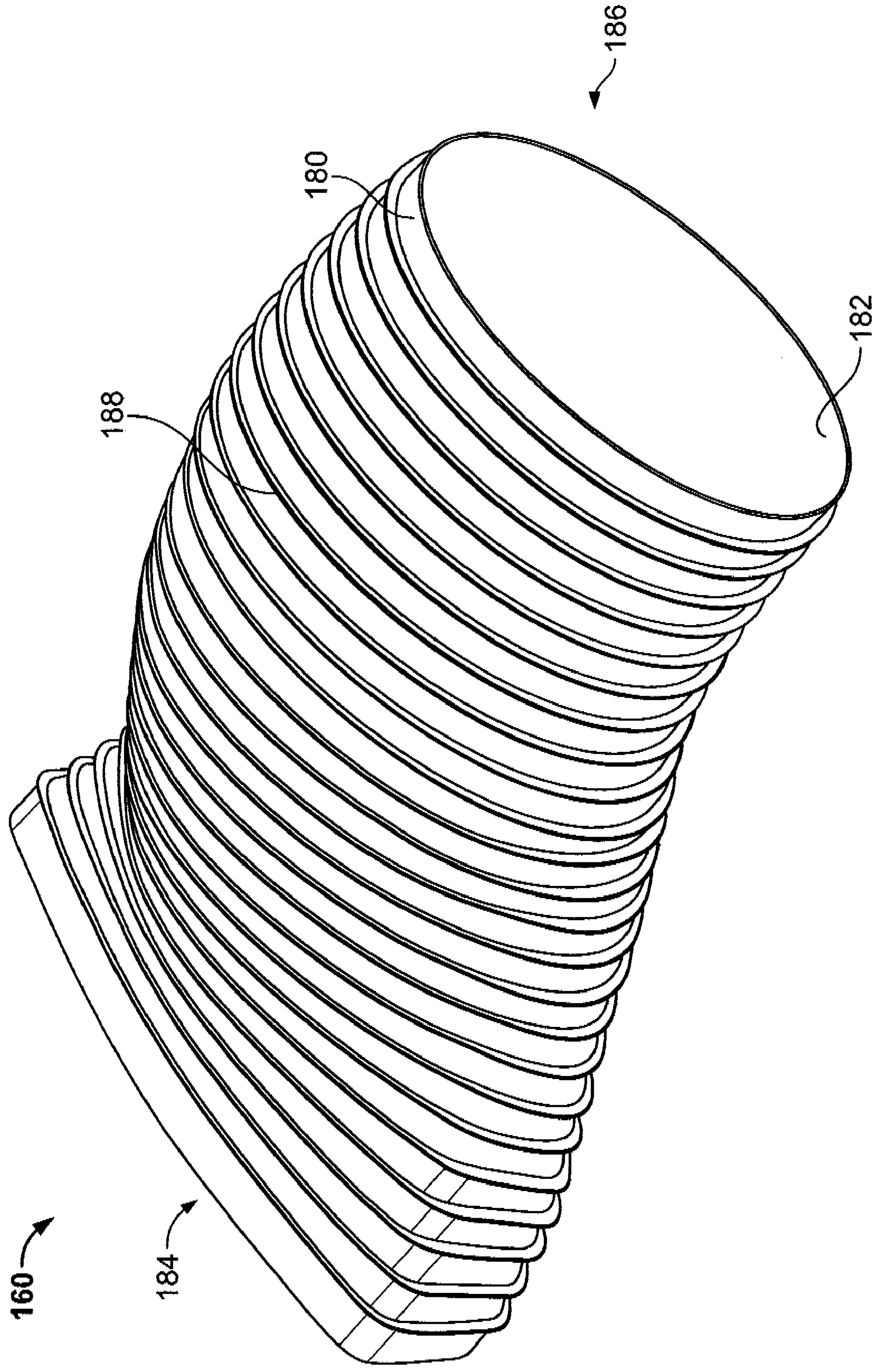
FIG. 3 is a perspective view of a transition piece that may be used with the combustor assembly shown in FIG. 2.

FIG. 3 is a perspective view of transition piece 160. Transition piece 160 includes an outer surface 180, an inner surface 182, a first end 184, and a second end 186. A helical turbulator 188 extends from outer surface 180. In the exemplary embodiment, turbulator 188 is a continuous structure that is formed integrally with transition piece 160 and extends helically about transition piece 160. In the exemplary embodiment wounded helical turbulator 188 is coupled to transition piece 160 using a braising process. In other embodiments, turbulator 188 is coupled to transition piece 160 using any other suitable coupling means, including a welding process. In another embodiment, turbulator 188 is formed onto surface 180 via a machining process. The cross-sectional shape of turbulator 188 may include but is not limited to being substantially circular, semi-circular, rectangular, or any other shape.

Alternatively, in another embodiment, turbulator 188 consists of a plurality of arcuate segments extending in a helical pattern across outer surface 180. The arcuate segments do not form a continuous helical turbulator, but rather adjacent segments are separated by a gap. Although the turbulator in such an embodiment is not continuous, the segments follow a single common path and induce a helical flow of compressed air around transition piece 160. Alternatively, in such an embodiment, posts or other equivalent structures may be positioned between adjacent segments.

In another alternative embodiment, turbulator 188 includes a plurality of independent parallel structures that extend helically about transition piece 160 in a wound pattern. Although the helical segments are independent and each follows a separate path, the plurality of helical segments induce a helical flow of compressed air around transition piece 160.

Referring to FIGS. 2 and 3, during operation, the majority of air discharged from compressor assembly 102 is channeled through compressor discharge plenum 142 towards combustor assembly 104, and the remaining air discharged from compressor assembly 102 is channeled downstream for use in cooling engine 100 components. More specifically, a first flow leg 168 of pressurized compressed air within plenum 142 is channeled into transition piece cooling passage 164 via impingement sleeve openings 166. Air entering openings 166 is channeled upstream through cooling passage 164 and discharged into combustion liner cooling passage 154. Turbulators 188 induce turbulence into the air entering passage 164. Moreover, turbulators 188 facilitate inducing a helical flow path of cooling air about transition piece 160. More specifically, air flowing through passage 164 is generally channeled in a helical path about transition piece 160 via turbulators 188, prior to being discharged into combustion liner cooling passage 154.

Air flowing around outer surface 180 facilitates enhanced cooling of transition piece 160 as compared to air flowing past a non-turbulated transition piece. More specifically, because the air flows helically over outer surface 180, the air remains against or "in contact" with transition piece 160 for a longer period of time as compared to a non-turbulated transition piece. As a result, transition piece 160 is more efficiently cooled by the helically-routed air due to its increase staying time. Moreover, unlike known transition piece turbulators, in the exemplary embodiment, turbulators 188 not only channel the air helically about transition piece 160, but also induce turbulence to the air.

In the exemplary embodiment, helical turbulators 188 channel a portion of the air flow around transition piece 160 in a helical manner. When air flow comes into contact with helical turbulators 188, a first portion of the air flow is channeled helically around transition piece and a second portion of air flow is forced over helical turbulator 188. Pressure losses are facilitated to be reduced with helical turbulators because only a portion of the air flow is forced over turbulator 188. The remaining portion of air flow flows around transition piece 160 in a helical path. The helical flow of air around transition piece 160 facilitates minimizing a pressure drop of air flow, while allowing air to cool transition piece 160. Moreover, turbulator 188 enhances the cooling of transition piece 160 such that the component useful life is facilitated to be increased.

Exemplary embodiments of transition pieces for use with turbine engines are described above in detail. The turbulators are not limited to use with the specific transition pieces described herein, but rather, the turbulators can be utilized independently and separately from other transition pieces described herein. Moreover, the invention is not limited to the embodiments of the transition piece or the turbulators described above in detail. Rather, other variations of helical turbulator embodiments may be utilized within the spirit and scope of the claims.

While the invention has been described in terms of various specific embodiments, those skilled in the art will recognize that the invention can be practiced with modification within the spirit and scope of the claims.

What is claimed is:

1. A method for assembling a gas turbine engine including a combustor assembly and a nozzle assembly, said method comprises:

providing a transition piece including a first end, a second end, and a body extending therebetween, where the body includes an inner surface, an opposite outer surface;

coupling the first end of the transition piece to the combustor assembly; and coupling the second end of the transition piece to the nozzle assembly such that a turbulator having a semi-circular cross-sectional shape extends helically and continuously in a single structure over the entire outer surface of the transition piece extends from the transition piece first end to the transition piece second end to facilitate inducing turbulence to cooling air supplied to the combustor assembly.

2. A method is accordance with claim 1 wherein providing a transition piece further comprises coupling a turbulator helically about the outer surface of the transition piece.

3. A method in accordance with claim 2 wherein said coupling a turbulator helically about the outer surface further comprises coupling the turbulator to the outer surface using a braising process.

4. A method in accordance with claim 1 wherein providing a turbulator further comprises providing a transition piece including a turbulator formed integrally with the transition piece.

5. A method in accordance with claim 2, wherein said coupling a turbulator helically about the outer surface further comprises coupling the turbulator to the outer surface using one of a welding process and a machining process.

6. A transition piece for a gas turbine engine, said transition piece comprises:

a first end;

a second end; and a body extending therebetween, said body comprises an inner surface, an opposite outer surface, and a turbulator extending helically and continuously in a single structure over the entire outer surface, said turbulator comprises a semi-circular cross-sectional shape, wherein said turbulator is configured to facilitate cooling said transition piece.

7. A transition piece in accordance with claim 6 wherein said first end has a substantially rectangular cross-sectional profile.

8. A transition piece in accordance with claim 7 wherein said second end has a substantially circular cross-sectional profile.

9. A transition piece in accordance with claim 6 wherein said turbulator is coupled to said outer surface.

10. A transition piece in accordance with claim 6 wherein said turbulator is formed integrally with said body.

11. A transition piece in accordance with claim 6 wherein said turbulator is coupled to said outer surface using one of a braising process, a welding process, and a machining process.

12. A transition piece in accordance with claim 6 wherein said turbulator facilitates extending the useful life of said transition piece by efficiently cooling said transition piece.

13. A gas turbine engine comprising:

a combustion assembly; and a transition piece coupled to said combustion assembly and extending downstream therefrom, said transition piece comprises a first end, a second end, and a body extending therefrom, said body comprises an inner surface, an outer surface, and a turbulator extending helically and continuously in a single structure over the entire outer surface, from said first end to said second end, wherein said turbulator comprises a semi-circular cross-sectional shape.

14. A gas turbine engine in accordance with claim 13 wherein said turbulator is coupled to said outer surface.

15. A gas turbine engine in accordance with claim 14 wherein said turbulator is coupled to said outer surface via a braising process.

16. A gas turbine engine in accordance with claim 13 wherein said turbulator is formed integrally with said body.

17. A gas turbine engine in accordance with claim 13 wherein said turbulator is coupled to said outer surface using one of a welding process and a machining process.

18. A gas turbine engine in accordance with claim 13 wherein said turbulator facilitates extending the useful life of said transition piece by efficiently cooling said transition piece.

* * * * *